US012428196B2

(12) United States Patent
Iwata et al.

(10) Patent No.: US 12,428,196 B2
(45) Date of Patent: *Sep. 30, 2025

(54) FABRICATING METHOD FOR QUARTZ VIAL

(71) Applicant: NEXUS COMPANY INC., Kyoto (JP)

(72) Inventors: Kenji Iwata, Kyoto (JP); Toshihito Kashiwagi, Kasai (JP)

(73) Assignee: NEXUS COMPANY INC., Kyoto (JP)

( * ) Notice: Subject to any disclaimer, the term of this patent is extended or adjusted under 35 U.S.C. 154(b) by 852 days.

This patent is subject to a terminal disclaimer.

(21) Appl. No.: 17/059,316

(22) PCT Filed: Oct. 29, 2019

(86) PCT No.: PCT/JP2019/042306
§ 371 (c)(1),
(2) Date: Nov. 27, 2020

(87) PCT Pub. No.: WO2020/129415
PCT Pub. Date: Jun. 25, 2020

(65) Prior Publication Data
US 2021/0163174 A1    Jun. 3, 2021

(30) Foreign Application Priority Data
Dec. 19, 2018 (JP) ................... 2018-237509

(51) Int. Cl.
C03B 27/044    (2006.01)
A61J 1/05    (2006.01)
(Continued)

(52) U.S. Cl.
CPC ............. B65D 13/02 (2013.01); A61J 1/05 (2013.01); C03B 23/18 (2013.01); C03B 2201/02 (2013.01)

(58) Field of Classification Search
CPC ....... C03B 23/18; C03B 23/057; C03B 23/13; C03B 23/07
See application file for complete search history.

(56) References Cited

U.S. PATENT DOCUMENTS 1,624,699 A * 4/1927 Wayringer ............ C03B 23/207
65/36
2,122,117 A * 6/1938 Stringer .................. H01J 9/505
445/2
(Continued)

FOREIGN PATENT DOCUMENTS

CN    109429486 A    3/2019
DE    69916416 T2 *  5/2005 ........... C03B 23/207
(Continued)

OTHER PUBLICATIONS

Jan. 18, 2022 Extended European Search Report issued in European Application No. 19899407.1.
(Continued)

Primary Examiner — Erin Snelting
Assistant Examiner — Steven S Lee
(74) Attorney, Agent, or Firm — Oliff PLC

(57) ABSTRACT

A fabricating method for a quartz vial having a body for containing a substance, a bottom closing a lower end of the body, a cylindrical neck disposed above the body, and a cylindrical mouth disposed above the neck and having an outer diameter larger than that of the neck includes the steps of forming an outer peripheral surface of the neck by shaving, and joining by thermal fusion, to the neck, the body that is separately fabricated. Thus, quartz vials having a predetermined shape can be mass-fabricated.

1 Claim, 4 Drawing Sheets

(51) Int. Cl.
   *B65D 13/02*   (2006.01)
   *C03B 23/18*   (2006.01)

(56) References Cited

U.S. PATENT DOCUMENTS

| | | | | |
|---|---|---|---|---|
| 2,297,335 | A * | 9/1942 | Wheaton, Jr. | C03B 23/091 215/47 |
| 2,918,753 | A * | 12/1959 | Dichter | C03B 23/112 65/227 |
| 2,935,819 | A * | 5/1960 | Dichter | C03B 23/07 65/227 |
| 3,144,320 | A * | 8/1964 | Ziegler | C03B 29/00 65/34 |
| 3,346,357 | A * | 10/1967 | Baak | C03C 10/00 65/36 |
| 3,362,435 | A * | 1/1968 | Meyer | C03B 23/098 65/276 |
| 4,010,022 | A * | 3/1977 | Schul | C03B 23/047 65/297 |
| 5,133,682 | A * | 7/1992 | Gilligan | C03B 23/0496 445/39 |
| 5,221,311 | A * | 6/1993 | Rising | G01N 33/18 65/102 |
| 6,227,392 | B1 * | 5/2001 | Balzeau | B65D 1/48 222/321.7 |
| 6,308,846 | B1 * | 10/2001 | Muller | B65D 23/0885 220/592.27 |
| 6,484,540 | B1 * | 11/2002 | Shimada | C03B 37/01211 65/DIG. 9 |
| 6,568,218 | B1 * | 5/2003 | Mueller | C03B 23/092 65/276 |
| 11,279,515 | B2 * | 3/2022 | Iwata | C03B 23/00 |
| 2004/0007280 | A1 * | 1/2004 | Rausch | C03B 23/11 138/DIG. 11 |
| 2004/0007579 | A1 * | 1/2004 | Gillest | B65D 7/38 220/660 |
| 2004/0045319 | A1 * | 3/2004 | Schussler | C03B 20/00 65/276 |
| 2008/0171147 | A1 | 7/2008 | Singh | |
| 2009/0099000 | A1 | 4/2009 | Kuwabara et al. | |
| 2014/0116011 | A1 * | 5/2014 | Eisen | C03B 23/207 53/467 |
| 2016/0137346 | A1 * | 5/2016 | Perlman | B24B 19/006 451/41 |
| 2016/0236962 | A1 * | 8/2016 | Baratta | C03C 27/042 |
| 2016/0280577 | A1 * | 9/2016 | Donelon | C03B 23/047 |

FOREIGN PATENT DOCUMENTS

| | | | | |
|---|---|---|---|---|
| DE | 102006011282 B4 * | 4/2008 | | B44C 5/005 |
| EP | 3 053 842 A1 | 8/2016 | | |
| EP | 2891393 B1 * | 8/2017 | | A61B 1/0002 |
| JP | S58-41732 A | 3/1983 | | |
| JP | S63-170233 A | 7/1988 | | |
| JP | 2001-097734 A | 4/2001 | | |
| JP | 2001270727 A * | 10/2001 | | C03B 23/092 |
| JP | 2002012433 A * | 1/2002 | | C03B 23/047 |
| JP | 2005097064 A * | 4/2005 | | C03B 23/045 |
| JP | 2012-180276 A | 9/2012 | | |
| JP | 2019-005330 A | 1/2019 | | |
| KR | 940011444 B1 * | 12/1994 | | C03B 23/11 |
| WO | 2006/037889 A1 | 4/2006 | | |
| WO | WO-2018132637 A1 * | 7/2018 | | A61L 31/028 |
| WO | 2019/004008 A1 | 1/2019 | | |

OTHER PUBLICATIONS

Dec. 3, 2019 International Search Report issued in International Patent Application No. PCT/JP2019/042306.

Jun. 9, 2020 Office Action issued in Japanese Patent Application No. 2018-237509.

Matumura et al., "Machining Process of Fused Silica with Ball End Mill," Proceedings of JSPE Semestrial Meeting, The Japan Society for Precision Engineering, 2005, pp. 637-638.

"Niwaldo Plus, We are the Company Performing a Grinding Process on Hard-Brittle, Difficult-to-Process Material," [Retrieved online Jul. 6, 2020] <https://niwablo-plus.jp/takashimaseisakusyo5545yyy/2016/06/24/abouttakashima-plant/>.

Dec. 3, 2019 Written Opinion issued in International Patent Application No. PCT/JP2019/042306.

* cited by examiner

Fig. 3A
Fig. 3B
Fig. 3C
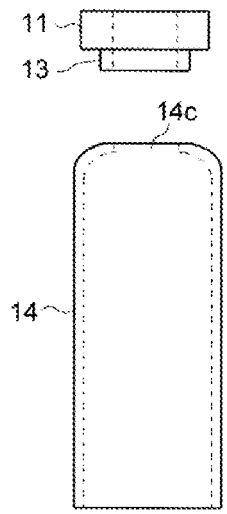
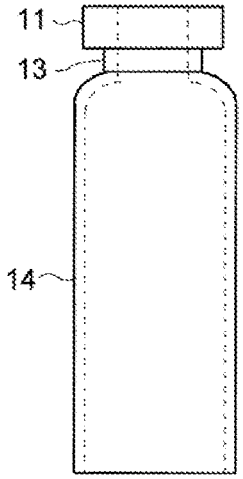
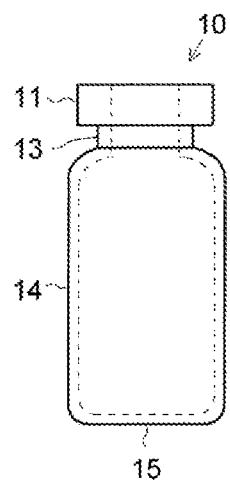
Fig. 4A
Fig. 4B
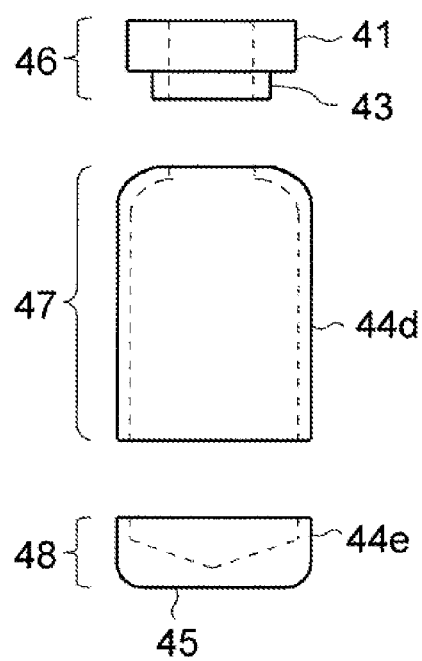
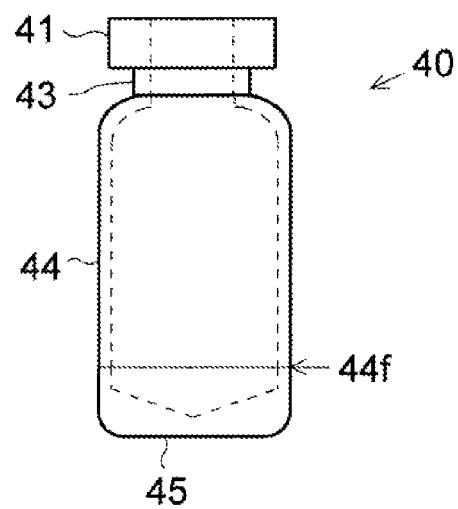

FABRICATING METHOD FOR QUARTZ VIAL

TECHNICAL FIELD

The present invention relates to a fabricating method for a vial used for containing a chemical agent or the like.

BACKGROUND ART

A vial has a body for containing a chemical agent or the like, a bottom part closing a lower end of the body, a cylindrical neck disposed above the body, and a cylindrical mouth disposed above the neck and having an outer diameter larger than that of the neck. For the material of such vials, hard glass such as borosilicate glass has been conventionally used (See Patent Literature 1, for example).

Such a vial may be stored for months or sometimes years containing chemical agents or vaccines. However, in some cases where a chemical agent is stored in a vial made of hard glass for a long time, boron, sodium or the like contained in the material of the vial may elute into the chemical agent, which causes a problem in the preservation of the chemical agent.

CITATION LIST

Patent Literature

Patent Literature 1: JP 2012-180276 A

SUMMARY OF INVENTION

Technical Problem

There are many kinds of glasses including doped glass, such as the above-described hard glass, in which silicon dioxide is added with various elements, and quartz glass made of high purity silicon dioxide. The above-described problem can be solved by using quartz glass as a material of a vial.

In order to securely seal the vial with a cap or the like and achieve a long-term storage of contents, it is necessary to provide a precise shape on an outer peripheral surface of the neck of the vial (i.e., portion brought into contact with the cap or the like). However, it has been very difficult to make a vial having the same shape as that of the conventional vial made of hard glass from a quartz material in a large quantity and at a reduced cost by a method similar to conventional method.

Specifically, in a conventional vial fabricating method, outer peripheral surface of the neck and the mouth is formed into a predetermined shape by pressing a roller having a predetermined shape against the outer peripheral surface of a heated glass tube while rotating the glass tube. However, quartz glass has a softening temperature higher than that of borosilicate glass, resulting in difficulty in mass-fabricating vials with an outer peripheral surface of the neck having a precise shape in a similar method to that of the conventional vial.

The present invention has been accomplished in view of the above points, and an object of the present invention is to provide a method capable of fabricating numerous quartz vials having a predetermined shape.

Solution to Problem

According to a first aspect of the present invention accomplished to solve the above-described problem, a fabricating method for a quartz vial having a body for containing a substance and a cylindrical neck disposed above the body includes the steps of: forming an outer peripheral surface of the neck by shaving a quartz glass member; and joining by thermal fusion, to the neck, the body that is separately fabricated.

Thermal fusion according to the present invention means joining heated glasses with each other by bringing the glasses into contact with each other. The "Shaving" includes grinding, cutting, and polishing.

In the fabricating method for a quartz vial according to the present invention, the outer peripheral surface of the neck of the quartz vital is formed by shaving, thus enabling the quartz vial having the outer peripheral surface of the neck having a precisely predetermined shape to be fabricated. Consequently, it is possible to mass-fabricate quartz vials for long-term storage of a chemical agent or the like and having excellent sealing capability.

Here, in joining the body to the neck, the lower end of the body may or may not be closed by the bottom. In the latter case, after joining of the body is completed, the lower end of the body is thermally sealed, thus forming the bottom. Alternatively, a separately formed bottom may be joined to the body.

According to a second aspect of the present invention accomplished to solve the above-described problem, a fabricating method for a quartz vial having a body for containing a substance and a cylindrical neck disposed above the body includes the steps of: forming an outer peripheral surface of the neck by shaving a quartz glass member; and forming the body by hot working a portion of the quartz glass member adjacent to the neck.

Here, "hot working" means thermally softening or melting quartz glass, and then deforming the quartz glass. In the above-described fabricating method, the step of forming the outer peripheral surface of the neck and the step of forming the body may be performed in this order or in a reversed order. In the step of forming the body, the bottom closing the lower end of the body may be further formed. Alternatively, only the body may be formed first, and then, the bottom made of another quartz glass member may be joined to the body.

According to a third aspect of the present invention accomplished to solve the above-described problem, a fabricating method for a quartz vial having a body for containing a substance and a cylindrical neck disposed above the body includes the steps of: forming the neck by cutting a cylindrical quartz glass member; and joining by thermal fusion, to the neck, the body that is separately fabricated.

According to the third aspect of the present invention, the fabricating method for a quartz vial, where the quartz vial further has a cylindrical mouth disposed above the neck and having an outer diameter larger than that of the neck, further can include the steps of: forming the mouth by cutting a second quartz glass member, which is a cylindrical glass member having the same inner diameter as an inner diameter of the quartz glass member and an outer diameter larger than an outer diameter of the quartz glass member; and joining the mouth to the neck at an end opposite to an end of a side on which the body is joined.

Furthermore, the present invention provides a quartz vial fabricated by the fabricating method for a quartz vial according to the first or third aspect of the present invention.

Specifically, according to the present invention, a quartz vial having a body for containing a substance and a cylindrical neck disposed above the body includes a joined portion formed by thermally fusing quartz glasses to each other at a position between a lower end of the neck and a lower end of the body.

According to the present invention, the quartz vial further having a cylindrical mouth disposed above the neck and having an outer diameter larger than that of the neck can include a joined portion formed by thermally fusing quartz glasses to each other at a position between a lower end of the mouth and a lower end of the body.

Advantageous Effects of Invention

As described above, according to the fabricating method for a quartz vial according to the present invention, quartz vials having a predetermined shape can be mass-fabricated.

BRIEF DESCRIPTION OF DRAWINGS

FIGS. 3A-3C are views for describing a fabricating method for the quartz vial according to the present embodiment.

FIGS. 4A-4B are views for describing another example of the fabricating method for the quartz vial according to the present embodiment.

DESCRIPTION OF EMBODIMENTS

Modes for carrying out the present invention will be described with reference to the attached drawings.

First Embodiment

Figure 1:
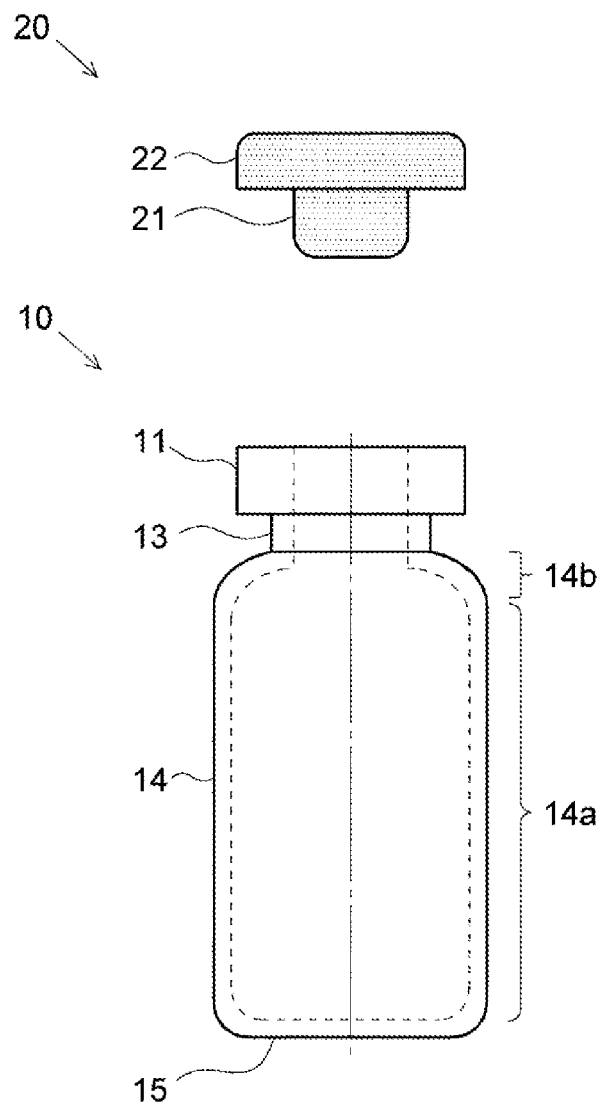
FIG. 1 is a side view showing the shapes of a quartz vial and a rubber plug attached to a mouth of the quartz vial according to the first aspect of the present invention.

FIG. 1 shows the configuration of a quartz vial 10 and a rubber plug 20 (a resin plug) attached to the quartz vial 10 according to a first embodiment of the present invention. The quartz vial 10 is entirely made of quartz glass, and includes a hollow body 14 for containing substances such as a chemical agent, a bottom 15 for closing the lower end of the body 14, a cylindrical neck 13 that is disposed above the body 14, and a cylindrical mouth 11 that is disposed above the neck 13 and has a larger outer diameter than that of the neck 13. The body 14 further includes a cylindrical main body portion 14a having a constant outer diameter and inner diameter, and a reduced diameter portion 14b that is located above the main body portion 14a and has an outer diameter and inner diameter gradually decreasing upward. The outer diameter of the neck 13 is equal to the outer diameter of the uppermost end of the body 14 (i.e., the upper end of the reduced diameter portion 14b). Therefore, the outer diameter of the neck 13 is smaller than the outer diameter of the portion of the body 14 having the largest outer diameter (i.e., the main body portion 14a). Through holes having the same diameter are provided in the respective centers of the mouth 11 and the neck 13, thus forming a passage from the upper end of the mouth 11 to the lower end of the neck 13. The passage communicates with the inside space of the body 14.

The rubber plug 20 is made of, for example, butyl rubber, and includes a plug part 21 that is inserted into the hole (i.e., the upper end of the through hole) formed at the mouth 11 of the quartz vial 10 and a disk part 22 that is brought into contact with the upper surface of the mouth 11 when the plug part 21 is inserted into the mouth 11 of the quartz vial 10.

The outer diameter of the mouth 11 of the quartz vial 10 is equal to the diameter of the disk part 22 of the rubber plug 20, and furthermore, the inner diameter of the mouth 11 (i.e., the diameter of the through hole) is equal to the outer diameter of the plug part 21 of the rubber plug 20.

Figure 2:
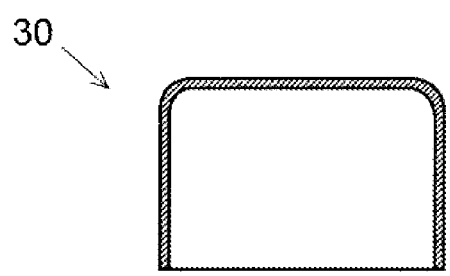
FIG. 2 is a cross-sectional view of a cap that is to cover the mouth of the quartz vial.

When the quartz vial 10 according to the present embodiment is used for storing a chemical agent or the like, the chemical agent or the like is contained in the body 14, and then the rubber plug 20 is fitted into the mouth 11. Furthermore, the rubber plug 20 is covered with a cap 30 (FIG. 2) made of relatively soft metal such as aluminum, and the cap 30 is caulked (tightly crimped) to thus tightly close the quartz vial 10.

A fabricating method for the quartz vial 10 according to the present embodiment will be explained below with reference to FIGS. 3A-3C. First, a quartz glass member having a predetermined shape and a predetermined size is prepared, and then, is subjected to hot working or shaving (grinding by the use of a grinding wheel), thus fabricating a part obtained by integrally forming the mouth 11 and the neck 13 of the quartz vial 10 (the upper section of FIG. 3A). At this time, the outer peripheral surface of at least the neck 13 is formed by shaving. The inner peripheral surfaces of the mouth 11 and the neck 13 may be subjected to grinding.

The body 14 without a bottom is made of another quartz glass member (hereinafter referred to as a second quartz glass member) other than the above-described quartz glass member (hereinafter referred to as a first quartz glass member). The body 14 is provided with an upper opening 14c having the same outer diameter and the same inner diameter as those of the neck 13 (the lower section of FIG. 3A). The body 14 can be fabricated, for example, by using a glass tube made of quartz glass as the second quartz glass member and by narrowing the diameter of one end thereof by a drawing roller while heating the end with a burner.

Thereafter, the lower end of the neck 13 made of the first quartz glass member and the peripheral edge of the upper opening 14c of the body 14 made of the second quartz glass member are heated by the burner, and then, they are brought into contact with each other, so that the part made of the first quartz glass member and the part made of the second quartz glass member are thermally fused to each other (FIG. 3B). Here, the outer peripheral surface of the neck 13 has become a frosted surface, as a result of shaving and therefore, it is desirable that the frosted surface should be heated by the burner during the thermal fusion or the like to melt and smooth the surface having fine unevenness.

Subsequently, the lower end of the body 14 is sealed while being heated by the burner, thus forming the bottom 15 of the quartz vial 10 (FIG. 3C). As a consequence, the quartz vial 10 is completed as a product.

In FIGS. 3A-3C, the part made of the first quartz glass member and the part made of the second quartz glass member are joined to each other in the state in which the lower end of the body 14 (i.e., an end opposite to the upper opening 14c) is open. However, the lower end of the body 14 may be sealed (i.e., the bottom 15 of the quartz vial 10 may be formed), before the part made of the first quartz glass member and the part made of the second quartz glass member may be joined to each other.

In the case where a quartz vial 40 having a conically recessed inner bottom (i.e., the upper surface of a bottom 45) shown in FIG. 4B is fabricated, a first part 46 obtained by integrally forming a mouth 41 and a neck 43, a second part 47 serving as an upper portion 44*d* of a body 44, and a third part 48 serving as a lower portion 44*e* of the body 44 and the bottom 45 having a conically recessed upper surface are separately fabricated, as shown in, for example, FIG. 4A. The quartz vial 40 is fabricated by joining these three parts 46, 47, and 48 by thermal fusion. The three parts 46, 47, and 48 can be fabricated, for example, by hot working or by shaving respective quartz glass members. At this time, the outer peripheral surface of at least the neck 43 is formed by shaving.

The quartz vial fabricated by either one of the above-described methods in the present embodiment has a joined portion formed by thermally fusing the quartz glasses to each other somewhere from the lower end of the neck to the lower end of the body. The quartz vial 10 fabricated by the method shown in, for example, FIGS. 3A-3C has a joined portion on the boundary between the neck 13 and the body 14. The quartz vial 40 fabricated by the method shown in, for example, FIGS. 4A-4B has a joined portion on the boundary between the neck 43 and the body 44, and furthermore, a joined portion (reference numeral 44*f* in FIG. 4B) somewhere between the upper end and the lower end of the body 44.

Second Embodiment

Figure 5A:
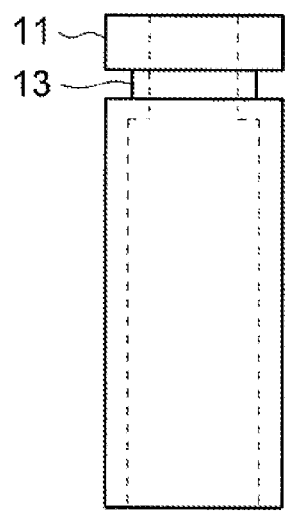
FIGS. 5A-5C are views for describing a fabricating method for a quartz vial according to a second embodiment of the present invention.
Figure 5B:
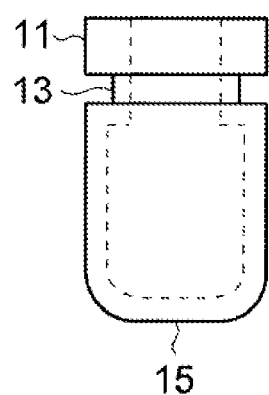
Figure 5C:
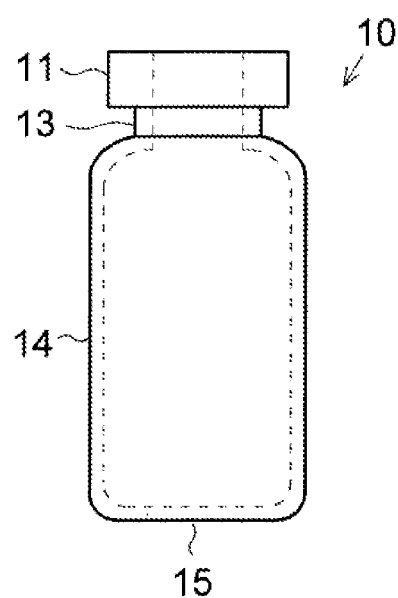

Subsequently, a fabricating method for a quartz vial according to a second embodiment of the present invention will be explained with reference to FIGS. 5A-5C. By a fabricating method for a quartz vial 10 according to the present embodiment, the entire quartz vial is formed integrally from a single quartz glass member. Here, the shape of the quartz vial 10 that will be a product is similar to that shown in FIG. 1. First, a cylindrical part is made of a quartz glass member having a proper size and a proper shape by, for example, melt molding or the like. Thereafter, a mouth 11 and a neck 13 for the quartz vial 10 are formed by shaving (e.g., grinding by the use of a grinding wheel), hot working by the use of a burner, or the like (FIG. 5A). At this time, the outer peripheral surface of at least the neck 13 is formed by shaving. Here, a surface formed by shaving is a frosted surface, and therefore, it is desirable that the frosted surface should be heated by the burner or the like to melt and smooth the surface having fine unevenness. Subsequently, the lower end of the cylindrical part is sealed while being heated by the burner, thus forming a bottom 15 of the quartz vial 10 (FIG. 5B). Next, a body 14 of the quartz vial 10 is formed by increasing the inner diameter, outer diameter, and length of a portion below the neck 13 (that is, a portion adjacent to the neck 13 of the cylindrical part and opposite to the mouth 11) by blowing (FIG. 5C). As a consequence, the quartz vial 10 is completed as a product.

Third Embodiment

Figure 6:
FIG. 6 is a view for describing a fabricating method for a quartz vial according to a third embodiment of the present invention.
Figure 6:
Figure 6:
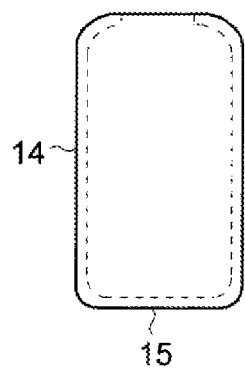

Subsequently, a fabricating method for a quartz vial according to a third embodiment of the present invention will be explained with reference to FIG. 6. Here, the shape of the quartz vial 10 fabricated by the method according to the present embodiment is similar to that shown in FIG. 1.

First, a part consisting of the mouth 11 and a part consisting of the neck 13 are separately fabricated by cutting respective quartz glass tubes. Here, the part consisting of the mouth 11 is fabricated by cutting a quartz glass tube having an inner diameter and an outer diameter respectively equal to the inner diameter and the outer diameter of the mouth 11 of the quartz vial 10 that will be a product. Here, the part consisting of the neck 13 is fabricated by cutting a quartz glass tube having an inner diameter and an outer diameter respectively equal to the inner diameter and the outer diameter of the neck 13 of the quartz vial 10 that will be a product.

Subsequently, these two parts are joined together by thermal fusion, and a part consisting of the body 14 and the bottom 15, which has been fabricated separately, is thermally fused to the lower end of the neck 13. The thus fabricated vial 10 has a joined portion formed by thermal fusion on the boundary between the mouth 11 and the neck 13 and on the boundary between the neck 13 and the body 14.

Also in the present embodiment, the lower end of the body 14 may be brought into an open state (i.e., a state without a bottom) at the time when parts are joined together, and the bottom 15 may be formed by closing the lower end of the body 14 after joining the parts together is completed.

Figure 7A:
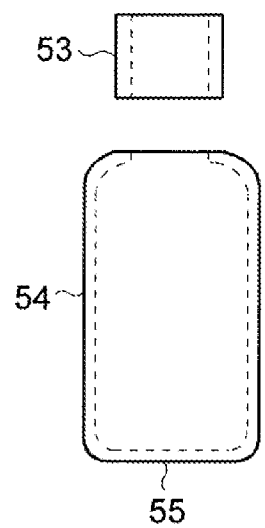
FIGS. 7A-7B are views for describing another example of the fabricating method for the quartz vial according to the present embodiment.
Figure 7B:
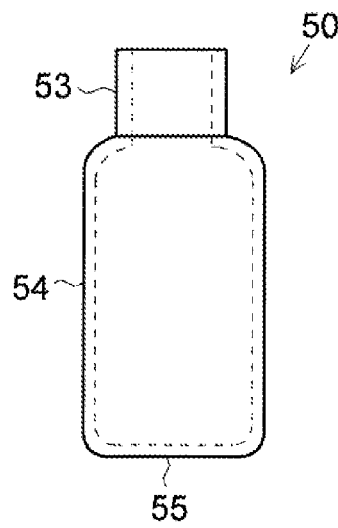

In the case where a vial 50 having no mouth (i.e., consisting of a neck 53, a body 54, and a bottom 55) shown in FIG. 7B is fabricated, a part consisting of the neck 53 is fabricated by preparing and cutting a quartz glass tube having an inner dimension and an outer dimension respectively equal to the inner dimension and the outer dimension of the neck 53 of a quartz vial 50 to be fabricated. The quartz vial 50 that will be a product is fabricated by joining, by thermal fusion, said part to a part consisting of the body 54 and the bottom 55, which has been fabricated separately. The thus fabricated quartz vial has a joined portion formed by thermal fusion on the boundary between the neck 53 and the body 54. Also in this case, the lower end of the body 54 may be brought into an open state (i.e., a state without a bottom) at the time when parts are joined together, and the bottom 55 may be formed by closing the lower end of the body 54 after joining the parts together is completed.

REFERENCE SIGNS LIST 10, 40, 50 . . . Quartz Vial
11, 41 . . . Mouth
13, 43, 53 . . . Neck
14, 44, 53 . . . Body
14*a* . . . Main Body Portion
14*b* . . . Reduced Diameter Portion
14*c* . . . Upper Opening
44*f* . . . Joined Portion
15, 45, 55 . . . Bottom
20 . . . Rubber Plug
21 . . . Plug Part
22 . . . Disk Part
30 . . . Cap

What is claimed is:
1. A fabricating method for a quartz vial having a body for containing a substance and a cylindrical neck disposed above the body comprising the steps of:
    forming an outer peripheral surface of the neck by grinding or polishing a quartz glass member; and forming the body by hot working a portion of the quartz glass member adjacent to the neck in order to increase an inner diameter, an outer diameter and a length of the body, wherein:
the neck and the body are formed integrally from a single quartz glass member, and
the hot working is a process in which the portion of the quartz glass member adjacent to the neck is thermally softened or melted and then the portion of the quartz glass member adjacent to the neck is deformed.

\* \* \* \* \*